(12) United States Patent
Meador et al.

(10) Patent No.: US 11,859,986 B2
(45) Date of Patent: Jan. 2, 2024

(54) SYSTEM AND METHOD FOR DELIVERY BY AUTONOMOUS VEHICLES

(71) Applicant: GM Cruise Holdings LLC, San Francisco, CA (US)

(72) Inventors: Timothy Jon Meador, Fairfield, CA (US); Alexis DeStasio, San Francisco, CA (US); Matthew Martin, Fairfax, CA (US); Andrew W. Clavijo, Hayward, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/549,574

(22) Filed: Dec. 13, 2021

(65) Prior Publication Data
US 2023/0184557 A1  Jun. 15, 2023

(51) Int. Cl.
| | |
|---|---|
| *G01C 21/34* | (2006.01) |
| *G07C 9/32* | (2020.01) |
| *B60W 60/00* | (2020.01) |
| *B60P 3/00* | (2006.01) |
| *G06Q 10/08* | (2023.01) |
| *G06Q 10/083* | (2023.01) |

(52) U.S. Cl.
CPC ............ *G01C 21/343* (2013.01); *B60P 3/007* (2013.01); *B60W 60/00256* (2020.02); *G06Q 10/083* (2013.01); *G07C 9/32* (2020.01)

(58) Field of Classification Search
None
See application file for complete search history.

(56) References Cited

U.S. PATENT DOCUMENTS

| | | | |
|---|---|---|---|
| 10,577,180 B1* | 3/2020 | Mehta | B25J 9/162 |
| 2015/0186840 A1* | 7/2015 | Torres | A47F 10/02 |
| | | | 705/339 |
| 2015/0302351 A1* | 10/2015 | Cassady | B65G 1/137 |
| | | | 705/339 |
| 2020/0341467 A1 | 10/2020 | Glendenning et al. | |
| 2021/0256472 A1* | 8/2021 | Javidan | G07C 9/00896 |

OTHER PUBLICATIONS

Matthias Prandtstetter, On the Impact of Open Parcel Lockers on Traffic, Jan. 14, 2021, MPDI (Year: 2021).*
Gauß et al., *Future of Urban Mobility—New Concepts Instead of New Technologies?*, © Springer Nature Switzerland AG 2021, 16 pages.

* cited by examiner

*Primary Examiner* — Resha Desai
*Assistant Examiner* — Ismail A Manejwala
(74) *Attorney, Agent, or Firm* — Akona IP PC

(57) ABSTRACT

Particular embodiments described herein provide for a system and method for facilitating autonomous delivery using a delivery assembly transported by an autonomous vehicle, the system and method can include determining a location of the delivery assembly and in response to determining the location of the delivery assembly, configuring a user interface to facilitate the autonomous delivery. The user interface has at least a point of origination configuration and a user configuration. In addition, the user interface can authenticate a user, allow the user to access one or more cubbies of the delivery assembly, and inform the user through one or more indicators on the user interface that the user can access a specific cubby.

20 Claims, 12 Drawing Sheets

SYSTEM AND METHOD FOR DELIVERY BY AUTONOMOUS VEHICLES

TECHNICAL FIELD OF THE DISCLOSURE

The present disclosure relates generally to autonomous vehicles (AVs) and, more specifically, to systems and methods for delivery by such vehicles.

BACKGROUND

An AV is a vehicle that is capable of sensing and navigating its environment with little or no user input. An autonomous vehicle may sense its environment using sensing devices such as radio detection and ranging (RADAR), light detection and ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
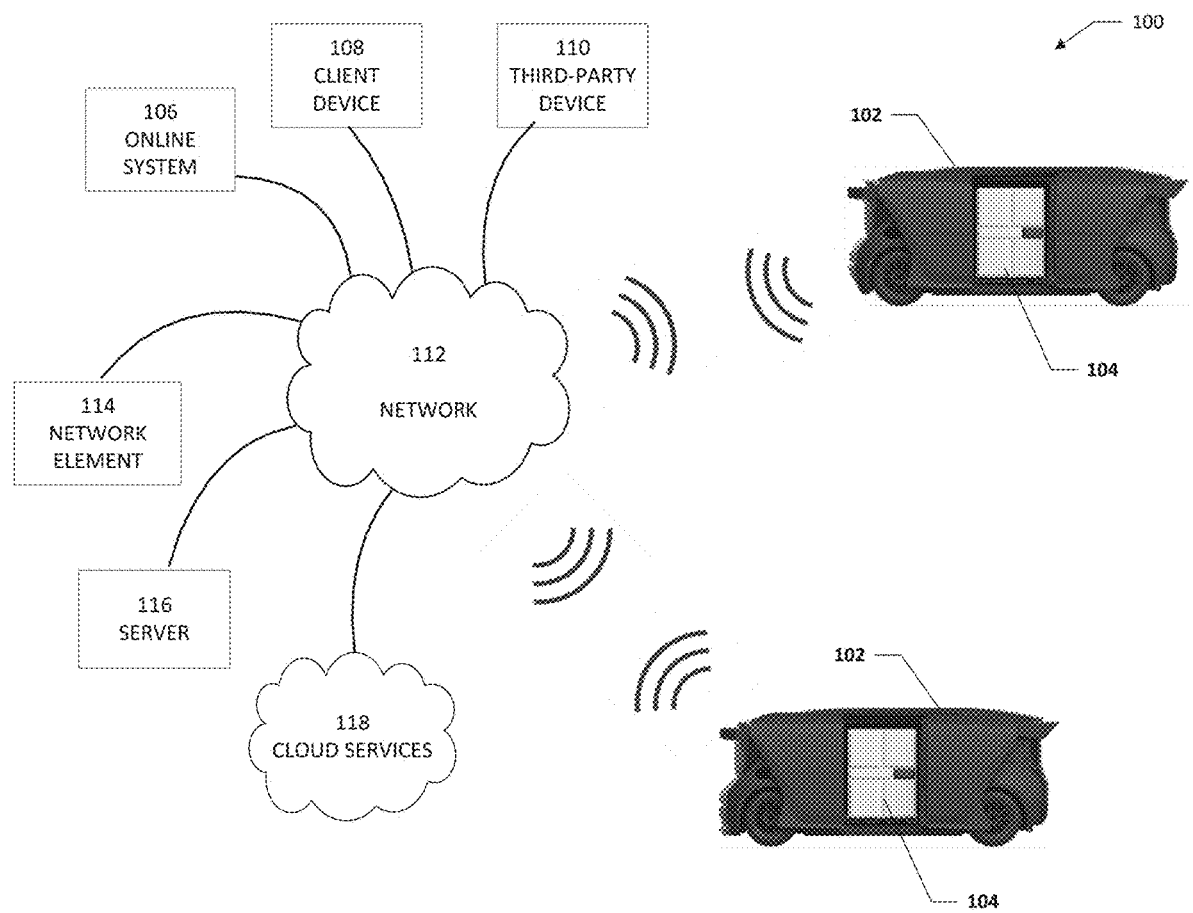
FIG. 1 shows an autonomous delivery environment according to some embodiments of the present disclosure.

The FIGURES of the drawings are not necessarily drawn to scale, as their dimensions can be varied considerably without departing from the scope of the present disclosure.

DESCRIPTION OF EXAMPLE EMBODIMENTS OF THE DISCLOSURE

Overview

The demand for contactless delivery robots has been rising. However, many contactless delivery robots cannot meet the rising demand due to high cost and technical challenges. For example, many contactless delivery robots are designed for delivering a particular type of item and cannot be used to deliver different items. Therefore, improved technology for autonomous delivery is needed.

An autonomous delivery system including a delivery assembly secured in an autonomous vehicle (AV) overcomes these problems. The system uses localization and navigation capabilities of the AV as well as certain features of the delivery assembly to provide a more advantageous autonomous delivery method. The AV can navigate to delivery destinations and control users' access to the delivery assembly by using its onboard sensors and onboard controller. For example, the onboard controller detects whether the AV has arrived at the destination and opens a door of the AV after the AV has arrived to allow access to the delivery assembly. The delivery assembly can include a user interface (UI) module that authenticates the user, allows the user to access one or more cubbies in the delivery assembly, and can generally help facilitate the delivery of one or more items to the user. After the user had collected one or more items from the one or more cubbies in the delivery assembly, the AV can close the door and continue to a next destination.

The delivery assembly is removably secured in the AV and facilitates delivering items to users or picking up items from users by using the AV. In some embodiments, the delivery assembly includes the one or more cubbies and the UI module. The one or more cubbies contain the items within a secured space (e.g., during the AV's motion). Each of the one or more cubbies can have various configurations to fit different types of items. In addition, the one or more cubbies in the delivery assembly can include one or more features to help secure and protect the items. The UI module provides information of the delivery to the user and allows the user to provide input for authenticating the user to allow the user to access one or more cubbies in the delivery assembly.

The autonomous delivery system leverages the autonomous features of the AV such as autonomous localization, navigation, and door control. Also, it can provide advantageous delivery service by using the delivery assembly. Further, the delivery assembly can be taken out of the AV so that the AV can still be used for other purposes, (e.g., rideshare). By combining the AV and the delivery assembly, the high cost and technical challenges for autonomous delivery can be reduced or even avoided. Also, the users are better protected.

Embodiments of the present disclosure provide a method for facilitating autonomous delivery using a delivery assembly transported by an AV. The method includes determining a location of the delivery assembly and, in response to determining the location of the delivery assembly, configuring a user interface to help facilitate the autonomous delivery. The user interface has at least a point of origination configuration and a customer user configuration (or more simply user configuration). The method can also include authenticating identification information of a user through the user interface. Based on the identification information of the user, the user can be allowed to access one or more cubbies of the delivery assembly. In some examples, one or more indicators on the user interface can inform the user that the user can access a specific cubby and the one or more indicators include light, text, sound, or some combination thereof. The method can also include determining that the user should access a first cubby before a second cubby and informing the user through the user interface that the first cubby is available to be accessed before the user has access to the second cubby.

In some examples, the user interface is configured in the point of origination configuration to allow a retail user (e.g., a retailer or supplier of goods) to load items into one or more cubbies of the delivery assembly and an indicator on the user interface can inform the user to place one or more items into a specific cubby of the delivery assembly. In other examples, the user interface is configured in the customer user configuration to allow a customer user to unload items from one or more cubbies of the delivery assembly and an indicator on the user interface can inform the customer user to retrieve one or more items from a specific cubby of the delivery assembly. The method can also include determining that a user has approached the delivery assembly, requesting user authentication from the user, determining if the user is an authorized user, and unlocking at least one door of a cubby from the plurality of cubbies if the user is determined to be an authorized user. In some examples, the user interface includes a keypad and the user authentication is a keycode entered into the user interface using the keypad. In other examples, the user interface includes a scanner and the user authentication can occur when the user scans a barcode or quick response (QR) code on their mobile device (e.g., a smartphone, wearable, etc.). In some examples, the user authentication can occur before one or more doors of the AV are opened to allow the user to access the locker.

As will be appreciated by one skilled in the art, aspects of the present disclosure, in particular aspects of dispatch-based charging for electric vehicle fleets, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as an "engine," a "circuit," a "module," or a "system." Functions described in this disclosure may be implemented as an algorithm executed by one or more hardware processing units (e.g., one or more microprocessors) of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied (e.g., stored) thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings. Other features and advantages of the disclosure will be apparent from the following description and the claims.

As described herein, one aspect of the present technology may be the gathering and use of data available from various sources to improve quality and experience. The present disclosure contemplates that in some examples, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y. In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus fifteen percent (±15%) variation.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Example Autonomous Delivery System

FIG. 1 shows an autonomous delivery environment 100 according to some embodiments of the present disclosure. The autonomous delivery environment 100 can include AVs 102, a delivery assembly 104, an online system 106, a client device 108, and a third-party device 110. Each of the AVs 102, the delivery assembly 104, the online system 106, the client device 108, and/or the third-party device 110 can be in communication using network 112. In addition, each of the AVs 102, the delivery assembly 104, the online system 106, the client device 108, and/or the third-party device 110 can be in communication with one or more network elements 114, one or more servers 116, and cloud services 118 using the network 112. In other embodiments, the autonomous delivery environment 100 may include fewer, more, or different components. For example, the autonomous delivery environment 100 may include a different number of AVs 102 with some AVs 102 including a delivery assembly 104 and some AVs 102 not including a delivery assembly 104 (not shown). A single AV is referred to herein as AV 102, and multiple AVs are referred to collectively as AVs 102. For purpose of simplicity and illustration, FIG. 1 shows one client device 108 and one third-party device 110. In other embodiments, the autonomous delivery environment 100 includes multiple third-party devices or multiple client devices.

In some embodiments, the autonomous delivery environment 100 includes one or more communication networks (e.g., network 112) that supports communications between some or all of the components in the autonomous delivery environment 100. The network 112 may comprise any combination of local area and/or wide area networks, using both wired and/or wireless communication systems. In one embodiment, the network uses standard communications technologies and/or protocols. For example, the network 112 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 112 may be represented using any suitable format, such as hypertext markup language (HTML) or extensible markup language (XML). In some embodiments, all or some of the communication links of the network 112 may be encrypted using any suitable technique or techniques.

The AV 102 is a vehicle that is capable of sensing and navigating its environment with little or no user input. The AV 102 may be a semi-autonomous or fully autonomous vehicle (e.g., a boat, an unmanned aerial vehicle, a driverless car, etc.). Additionally, or alternatively, the AV 102 may be a vehicle that switches between a semi-autonomous state and a fully autonomous state and thus, the AV may have attributes of both a semi-autonomous vehicle and a fully autonomous vehicle depending on the state of the vehicle. The AV 102 may include a throttle interface that controls an engine throttle, motor speed (e.g., rotational speed of electric motor), or any other movement-enabling mechanism, a brake interface that controls brakes of the AV (or any other movement-retarding mechanism), and a steering interface that controls steering of the AV (e.g., by changing the angle of wheels of the AV). The AV 102 may additionally or alternatively include interfaces for control of any other vehicle functions (e.g., windshield wipers, headlights, turn indicators, air conditioning, etc.

In some embodiments, an AV 102 includes an onboard sensor suite. The onboard sensor suite detects surrounding environment of the AV 102 and generates sensor data describing the surround environment. The onboard sensor suite may include various types of sensors. In some embodiments, the onboard sensor suite includes a computer vision ("CV") system, localization sensors, and driving sensors. For example, the onboard sensor suite may include photodetectors, cameras, RADAR, sound navigation and ranging (SONAR), LIDAR, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 102.

In some embodiments, the onboard sensor suite may include one or more sensors for a delivery assembly 104 that is secured in the AV 102. The delivery assembly 104 can help facilitate the delivery of items (e.g., prepared foods, groceries, packages, etc.) by the AV 102. The delivery assembly 104 defines a space where the items can be stored in the AV 102. The space may be a controlled environment. For example, access to space inside the delivery assembly 104 where items are stored may require authentication of the identify of a user. As another example, a physical condition (e.g., temperature, lightening, etc.) of the space is maintained at a desired level. The delivery assembly 104 may include features that facilitate users (e.g., customers or personnel of a retail entity) to load or unload items from the AV 102. The delivery assembly 104 may support a UI that provides the users information regarding the loading or unloading process. The UI may also allow the users to interact with the delivery assembly 104 or the AV 102 during the loading or unloading process. The delivery assembly 104 may include features to protect the users during the loading or unloading process. The delivery assembly 104 may also include privacy features to protect the privacy of the user.

The AV 102 also includes an onboard controller. The onboard controller controls operations and functionality of the AV 102. In some embodiments where the AV 102 includes the delivery assembly 104, the onboard controller may control some operations and functionality of the delivery assembly 104. In other embodiments where the AV 102 includes the delivery assembly 104, the operations and functionality of the delivery assembly 104 is separate from the onboard controller. In some embodiments, the onboard controller is a general-purpose computer, but may additionally or alternatively be any suitable computing device. The onboard controller is adapted for input/output (I/O) communication with other components of the AV 102 (e.g., the onboard sensor suite, an UI module of the delivery assembly, etc.) and external systems (e.g., the online system 106). The onboard controller may be connected to the Internet via a wireless connection (e.g., via a cellular data connection). Additionally or alternatively, the onboard controller may be coupled to any number of wireless or wired communication systems.

The onboard controller processes sensor data generated by the onboard sensor suite and/or other data (e.g., data received from the online system 106) to determine the state of the AV 102. Based upon the vehicle state and programmed instructions, the onboard controller modifies or controls behavior of the AV 102. In some embodiments, the onboard controller implements an autonomous driving system (ADS) for controlling the AV 102 and processing sensor data from the onboard sensor suite and/or other sensors in order to determine the state of the AV 102. Based upon the vehicle state and programmed instructions, the onboard controller modifies or controls driving behavior of the AV 102.

An AV 102 may also include a rechargeable battery that powers the AV 102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 102 is a hybrid electric vehicle that also includes an internal combustion engine for powering the AV 102 (e.g., when the battery has low charge). In some embodiments, the AV 102 includes multiple batteries. For example, the AV 102 can include a first battery used to power vehicle propulsion, and a second battery used to power the delivery assembly 104 and/or AV hardware (e.g., the onboard sensor suite and the onboard controller 130). The AV 102 may further include components for charging the battery (e.g., a charge port configured to make an electrical connection between the battery and a charging station).

The online system 106 manages delivery services using the AVs 102. A delivery service is a delivery of one or more items from one location to another location. In some embodiments, a delivery service is a service for picking up an item from a location of a business (e.g., a grocery store, a distribution center, a warehouse, etc.) and delivering the item to a location of a customer of the business. In other embodiments, a delivery service is a service for picking up an item from a customer of the business and delivering the item to a location of the business (e.g., for purpose of returning the item).

The online system 106 may select an AV 102 from a fleet of AVs 102 to perform a particular delivery service and instruct the selected AV 102 to autonomously drive to a particular location. The online system 106 sends a delivery request to the AV 102. The delivery request includes information associate with the delivery service, information of a user requesting the delivery (e.g., location, identifying information, etc.), information of an item to be delivered (e.g., size, weight, or other attributes), etc. In some embodiments, the online system 106 may instruct one single AV 102 to perform multiple delivery services. For example, the online system 106 instructs the AV 102 to pick up items from one location and deliver the items to multiple locations, or vice versa. The online system 106 also manages maintenance tasks, such as charging and servicing of the AVs 102. As shown in FIG. 1, each of the AVs 102 communicates with the online system 106. The AVs 102 and online system 106 may connect over a public network, such as the Internet.

In some embodiments, the online system 106 may also provide the AV 102 (and particularly, onboard controller 145) with system backend functions. The online system 106 may include one or more switches, servers, databases, live advisors, or an automated voice response system (VRS). The online system 106 may include any or all of the aforementioned components, which may be coupled to one another via a wired or wireless local area network (LAN). The online system 106 may receive and transmit data via one or more appropriate devices and network from and to the AV 102, such as by wireless systems, such as 882.11x, general packet radio service (GPRS), and the like. A database at the online system 106 can store account information such as subscriber authentication information, vehicle identifiers, profile records, behavioral patterns, and other pertinent subscriber information. The online system 106 may also include a database of roads, routes, locations, etc. permitted for use by AV 102. The online system 106 may communicate with the AV 102 to provide route guidance in response to a request received from the vehicle.

For example, based upon information stored in a mapping system of the online system 106, the online system 106 may determine the conditions of various roads or portions thereof. Autonomous vehicles, such as the AV 102, may, in the course of determining a navigation route, receive instructions from the online system 106 regarding which roads or portions thereof, if any, are appropriate for use under certain circumstances, as described herein. Such instructions may be based in part on information received from the AV 102 or other autonomous vehicles regarding road conditions. Accordingly, the online system 106 may receive information regarding the roads/routes generally in real-time from one or more vehicles.

The online system 106 communicates with the client device 108. For example, the online system 106 receives delivery requests from the client device 108. A delivery request is a request to deliver one or more items from a location to another location. The delivery request may include information of the items, information of the locations (e.g., store location, distribution center location, warehouse location, location of a customer, etc.), and so on. The online system 106 can provide information associated with the delivery request (e.g., information of the status of the delivery process) to the client device 108.

The client device 108 may be a device (e.g., a computer system) of a user of the online system 106. The user may be an entity or an individual. In some embodiments, a user may be a customer of another user. In an embodiment, the client device 108 is an online system maintained by a business (e.g., a retail business, a package service business, etc.). The client device 108 may be an application provider communicating information describing applications for execution by the third-party device 110 or communicating data to the third-party device 110 for use by an application executing on the third-party device 110.

The third-party device 110 is one or more computing devices capable of receiving user input as well as transmitting and/or receiving data via the network. The third-party device 110 may be a device of an individual. The third-party device 110 communicates with the client device 108 to request delivery or return of items. For example, the third-party device 110 may send a delivery request to the client device 108 through an application executed on the third-party device 110. The third-party device 110 may receive from the client device 108 information associated with the request, such as status of the delivery process. In one embodiment, the third-party device 110 is a conventional computer system, such as a desktop or a laptop computer. Alternatively, a third-party device 110 may be a device having computer functionality, such as a personal digital assistant (PDA), a mobile telephone, a smartphone, or another suitable device. A third-party device 110 is configured to communicate via the network. In one embodiment, a third-party device 110 executes an application allowing a user of the third-party device 110 to interact with the online system 106. For example, a third-party device 110 executes a browser application to enable interaction between the third-party device 110 and the online system 106 via the network. In another embodiment, a third-party device 110 interacts with the online system 106 through an application programming interface (API) running on a native operating system of the third-party device 110, such as IOS® or ANDROID™.

Example Online System

Figure 2:
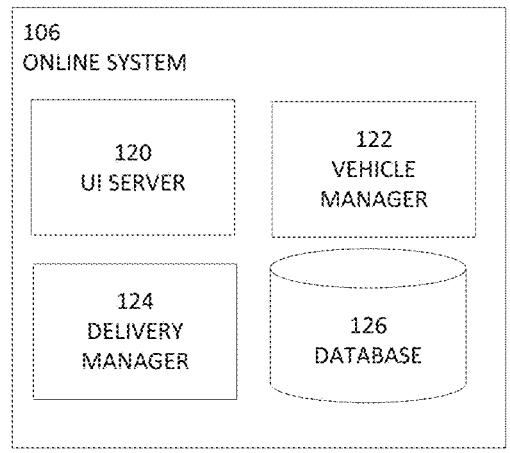
FIG. 2 is a block diagram illustrating an online system according to some embodiments of the present disclosure.

FIG. 2 is a block diagram illustrating the online system 106 according to some embodiments of the present disclosure. The online system 106 can include a UI server 120, a vehicle manager 122, a delivery manager 124, and a database 126. Alternative configurations, different or additional components may be included in the online system 106. Further, functionality attributed to one component of the online system 106 may be accomplished by a different component included in the online system 106 or a different system (e.g., the onboard controller of an AV 102).

The UI server 120 is configured to communicate with third-party devices (e.g., the third-party device 110) that provide a UI to users. For example, the UI server 120 may be a web server that provides a browser-based application to third-party devices, or the UI server 120 may be a mobile app server that interfaces with a mobile app installed on third-party devices. The UI server 120 enables the user to request a delivery by using an AV 102.

The vehicle manager 122 manages and communicates with a fleet of AVs (e.g., the AVs 102). The vehicle manager 122 may assign AVs 102 to various tasks and direct the movements of the AVs 102 in the fleet. For example, the vehicle manager 122 assigns an AV 102 to perform a delivery service requested by a user through the UI server 120. The user may be associated with the client device 108. The vehicle manager 122 may instruct AVs 102 to drive to other locations while not servicing a user (e.g., to improve geographic distribution of the fleet, to anticipate demand at particular locations, to drive to a charging station for charging, etc.). The vehicle manager 122 also instructs AVs 102 to return to AV facilities for recharging, maintenance, or storage.

The delivery manager 124 manages delivery services requested by users of the online system 106 (e.g., a user associated with the client device 108). The delivery manager 124 processes a delivery request from a user and sends information in the delivery request to the vehicle manager 122 for the vehicle manager 122 to select an AV 102 meeting the need of the user. The delivery manager 124 may also monitor the process of a delivery service (e.g., based on the state of the AV 102 and the state of the delivery assembly 104 in the AV 102). In some embodiments, the delivery manager 124 sends information of the delivery process to the client device 108 so that the user can be informed of the status of the delivery service. The delivery manager 124 may also analyze errors detected during the performance of the delivery service. The delivery manager 124 may assist to help resolve the error. For example, the delivery manager 124 may determine a solution to help fix the error. The solution may include an instruction to the onboard controller of the AV 102 or a person loading/unloading the item. As yet another example, the delivery manager 124 communicates the error to the client device 108 and requests the client device 108 to help fix the error.

The database 126 stores data used, generated, received, or otherwise associated with the online system 106. For example, the database 126 stores data associated with the AVs 102, data received from the client device 108, data associated with users of the online system 106, and so on.

Example Onboard Controller

Figure 3:
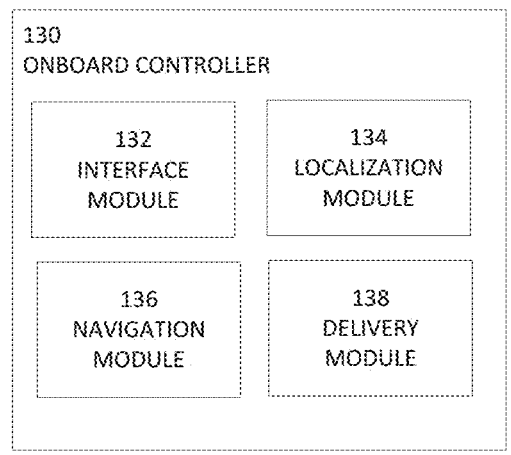
FIG. 3 is a block diagram illustrating an onboard controller of an AV according to some embodiments of the present disclosure.

FIG. 3 is a block diagram illustrating an onboard controller 130 of the AV 102 according to some embodiments of the present disclosure. The onboard controller 130 includes an interface module 132, a localization module 134, a navigation module 136, and an AV delivery module 138. Alternative configurations, different or additional components may be included in the onboard controller 130. Further, functionality attributed to one component of the onboard controller 130 may be accomplished by a different component included in the AV 102 or a different system (e.g., the online system 106).

The interface module 132 facilitates communications of the onboard controller 130 with other systems. For example, the interface module 132 supports communications of the onboard controller 130 with other systems (e.g., the online system 106). The interface module 132 supports communications of the onboard controller 130 with other components of the AV 102 (e.g., the onboard sensor suite, delivery assembly 104, and/or actuators in the AV 102). For example, the interface module 132 may retrieve sensor data generated by the onboard sensor suite, communicate with an UI module of the delivery assembly 104, and/or send commands to the actuators.

The localization module 134 localizes the AV 102. The localization module 134 may use sensor data generated by the onboard sensor suite to determine the current location of the AV 102. The sensor data includes information describing an absolute or relative position of the AV 102 (e.g., data generated by GPS, global navigation satellite system (GNSS), IMU, etc.), information describing features surrounding the AV 102 (e.g., data generated by a camera, RADAR, SONAR, LIDAR, etc.), information describing motion of the AV 102 (e.g., data generated by the motion sensor), or some combination thereof. In some embodiments, the localization module 134 uses the sensor data to determine whether the AV 102 has entered a local area, such as a parking garage or parking lot where the AV 102 can be charged. In some other embodiments, the localization module 134 may send the sensor data to the online system 106 and receive from the online system 106 a determination whether the AV 102 has entered the local area.

In some embodiments, the localization module 134 determines whether the AV 102 is at a predetermined location (e.g., a destination of a delivery service). For example, the localization module 134 uses sensor data generated by the onboard sensor suite (or a sensor in the onboard sensor suite) to determine the location of the AV 102. The localization module 134 may further compare the location of the AV 102 with the predetermined location to determine whether the AV 102 has arrived. The localization module 134 may provide locations of the AV 102 to the AV delivery module 138.

The localization module 134 can further localize the AV 102 within the local area. For example, the localization module 134 determines a pose (position or orientation) of the AV 102 in the local area. In some embodiments, the localization module 134 localizes the AV 102 within the local area by using a model of the local area. The model may be a 2D or 3D representation of the surrounding area, such as a map or a 3D virtual scene simulating the surrounding area. In various embodiments, the localization module 134 receives the model of the local area from the online system 106. The localization module 134 may send a request for the model to the online system 106 and in response, receive the model of the local area. In some embodiments, the localization module 134 generates the request based on sensor data indicating a position or motion of the AV 102. For example, the localization module 134 detects that the AV 102 is in the local area or is navigated to enter the local area based on the sensor data and sends out the request in response to such detection. This process can be dynamic. For example, the localization module 134 may send new request to the online system 106 as the AV 102 changes its position.

The localization module 134 may further localize the AV 102 with respect to an object in the local area. An example of the object is a building in the local area. The localization module 134 may determine a pose of the AV 102 relative to the building based on features in the local area. For example, the localization module 134 retrieves sensor data from one or more sensors (e.g., camera, LIDAR, etc.) in the onboard sensor suite that detect the features. The localization module 134 uses the sensor data to determine the pose of the AV 102. The features may be lane markers, street curbs, driveways, and so on. A feature may be two-dimensional or three-dimensional.

The navigation module 136 controls motion of the AV 102. The navigation module 136 may control the motor of the AV 102 to start, pause, resume, or stop motion of the AV 102. The navigation module 136 may further control the wheels of the AV 102 to control the direction the AV 102 will move. In various embodiments, the navigation module 136 generates a navigation route for the AV 102 based on a location of the AV 102, a destination, and a map. The navigation module 136 may receive the location of the AV 102 from the localization module 134. The navigation module 136 receives a request to go to a location and generate a route to navigate the AV 102 from its current location, which is determined by the localization module 134, to the location. The navigation module 136 may receive the destination from the AV delivery module 138 or an external source, such as the online system 106, through the interface module 132.

The AV delivery module 138 manages autonomous delivery by the AV 102. Functionality attributed to the AV delivery module 138 may be accomplished by a different component of the autonomous delivery environment 100, such as the delivery assembly 104. In some embodiments, the AV delivery module 138 processes delivery requests received from the online system 106. The AV delivery module 138 may communicate with the localization module 134 and the navigation module 136 to navigate the AV 102 based on the delivery requests (e.g., to navigate the AV 102 to locations specified in the delivery request).

The AV delivery module 138 may monitor or control the delivery assembly 104 in the AV 102. The AV delivery module 138 may determine a size limit of the delivery assembly 104 (e.g., based on the size of the container in the delivery assembly 104). The AV delivery module 138 may further determine whether the item that the online system 106 requests the AV 102 to deliver ("requested item") can fit in the delivery assembly 104 based on the size limit. In embodiments that the AV delivery module 138 determines that the requested item has a size larger than the size limit of the delivery assembly 104, the AV delivery module 138 may communicate with the online system 106 to cancel or change the delivery request.

Example Delivery Assembly

Figure 4:
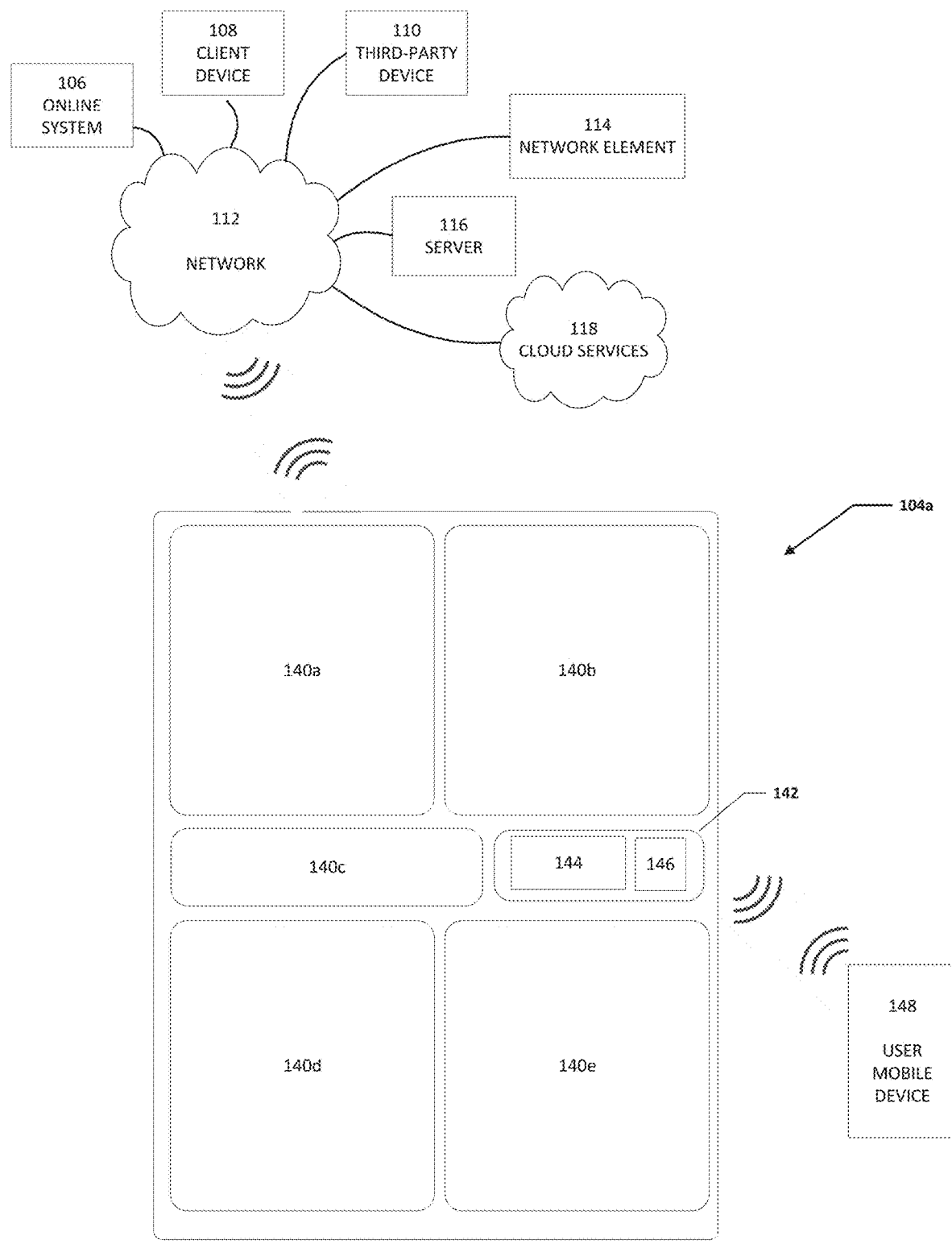
FIG. 4 illustrates a delivery assembly according to some embodiments of the present disclosure.

FIG. 4 illustrates a delivery assembly 104 according to some embodiments of the present disclosure. The delivery assembly 104 includes a plurality of cubbies 140a-104e and a UI module 142. In some embodiments, the delivery assembly 104 may include different components. For example, the delivery assembly 104 may include a securing mechanism to secure the delivery assembly 104 to the AV 102. The delivery assembly 104 can communicate with the network 112 (and the online system 106, the third-party device 110, the one or more network elements 114, the one or more servers 116, and/or cloud services 118) on a separate network path other than the network path used by AV 102. The delivery assembly 104 can also communicate with a user's mobile device 148 to authenticate the user and to allow the user to interact with the UI module 142. The user's mobile device 148 can be a smart phone, wearable, or some other portable communication device associated with the user.

Each of the cubbies 140a-104e provides space and securement of items delivered by the AV 102 and each of the cubbies 140a-104e may have various shapes or sizes. Each cubby is locked to protect user privacy in embodiments where the AV 102 is used to deliver items to multiple users. For example, the item for the first user can be placed in the cubby 140a, and the item for the second user can be placed in cubby 140b. When the first user unloads the first item from the cubby 140a, the second item is invisible to the first user as the second item is in the cubby 140b. After the first user finishes unloading the first item (e.g., after the AV 102 closes the door and leaves the location of the first user) or when the second item can be picked up by the second user (e.g., after the AV 102 arrives at the location of the second user), the cubby 140b can be unlocked and the second item can be collected by the second user.

Each of the cubbies 140a-104e in FIG. 4 are for illustration purposes and in other embodiments, the cubbies 140a-104e may have other configurations. For example, the cubby 140a may be a smaller cubby or cubies 104a and 104b may be combined into one large cubby. Each of the cubbies 140a-104e may also include a shelf, a drawer, a cabinet, or other types of storage components. The delivery assembly 104 may be made of a plastic material, metal, other types of materials, or some combination thereof. In some embodiments, the delivery assembly 104 and each of the cubbies 104a-104c has a size limit and the size of items delivered using the delivery assembly 104 does not exceed the size limit. The delivery assembly 104 may have a frame that can be secured to the AV 102.

The UI module 142 can include a display 144 and a UI input 146. In an example, the display 144 is a touchscreen display. In some examples, the UI input 146 may be a keypad (e.g., a physical keypad or a digital keypad). The UI module 142 provides a user information associated with loading or unloading items. For example, the display 144 can provide graphical information to the user related to loading or unloading items and the UI input 146 can allow the user to input information related to loading or unloading items. The UI module 142 have a shape that is similar to rectangular and can be located in a middle right-side portion of the delivery assembly 104. In other embodiments, the UI module 142 may have a different shape and/or location.

The UI module 142 informs the user of the state of the item in the delivery assembly 104 or more specifically, a specific cubby (e.g., the item is ready for being picked up, the item has been picked up, etc.), the state of the AV 102 (e.g., a door is open, a door is to be closed, etc.), actions to be taken by the user (e.g., moving the sliding bin 420, unloading an item, loading an item, closing a door of the AV 102, etc.), and so on. The UI module 142 can also be used to authenticate a user (e.g., the user enters a code using the UI input 146, the user scans a code on their phone into the UI input 146, etc.). For example, the UI module 430 may include a camera or scanner to capture identification information from the user. The UI module 142 may provide information to the user through one or more indicators generated by the UI module 142. An indicator may be light, text, sound, or some combination thereof.

Example UI Module

Figure 5:
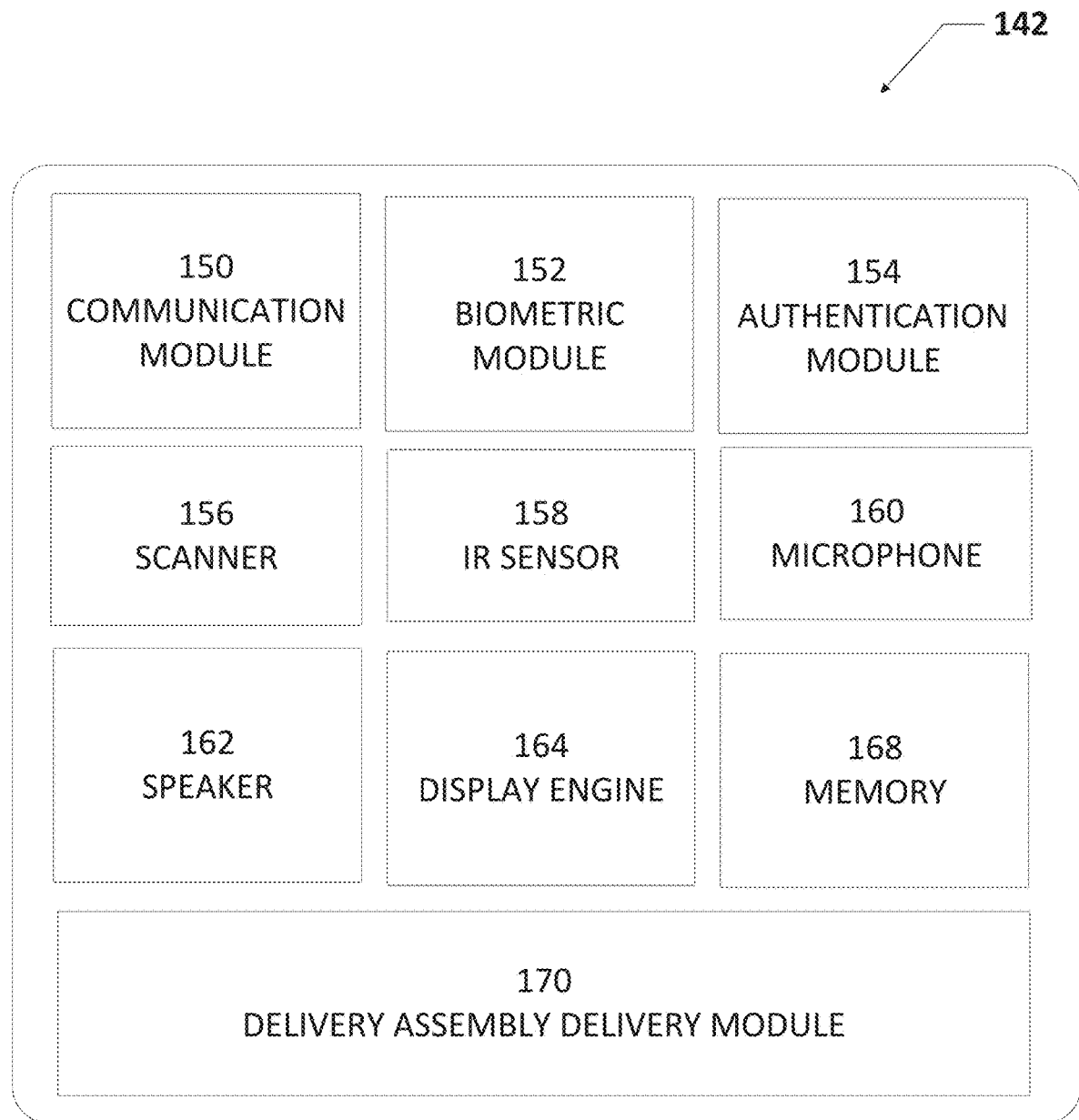
FIG. 5 illustrates a portion of a user interface for use in a delivery assembly according to some embodiments of the present disclosure.

FIG. 5 illustrates the UI module 142 according to some embodiments of the present disclosure. The UI module 142 can include a communication module 150, a biometric module 152, an authentication module 154, a scanner 156, an infrared (IR) sensor 158, a microphone 160, a speaker 162, a display engine 164, memory 168, and a delivery assembly delivery module 170. The communication module 150 can help facilitate communications between the delivery assembly 104 and the network 112 (and the online system 106, the third-party device 110, the one or more network elements 114, the one or more servers 116, and/or cloud services 118). The communication module 150 can also help facilitate communications between the delivery assembly 104 and the AV 102 and between the delivery assembly 104 and a user's mobile device (e.g., the user's mobile device 148, illustrated in FIG. 4).

The biometric module 152 can be a biometric sensor or some other device that can collect biometric data of the user. The authentication module 154 can be configured to authentic a user. For example, the authentication module 154 can receive biometric data from the biometric module and use the received biometric data to authenticate a user. The scanner 156 may be a bar code scanner, QR code scanner, or some other type of scanner that can be used to help input data into the UI module 142. For example, the scanner 156 may be a QR code scanner that a user can use to help authenticate a user. Also, the scanner 156 can be a bar code scanner where items are scanned into the UI module 142 as they are placed in a cubby.

The IR sensor 158 can be an active IR sensor or a passive IR sensor. The IR sensor can be used to sense characteristics in the environment around the UI module 142 by emitting and/or detecting infrared radiation. More specifically, the IR sensor 158 can detect the heat being emitted by an object and detect motion of a user (e.g., when a user approaches the delivery assembly 104). The microphone 160 can be used to detect sound, especially voice commands from the user. The speaker 162 can be used to provide audio for the user, especially audio prompts about the location of an item in a specific cubby. The display engine 164 can help provide the visual data that is displayed on the display of the UI module 142. Memory 168 can include data related to the operation of the delivery assembly 104 such as the specific cubby that includes one or more items for a specific user, user authentication data, etc.

The delivery assembly delivery module 170 can use sensor data generated by sensors in the delivery assembly to determine the state of an item in the delivery assembly. For example, the delivery assembly delivery module 170 detects whether the item has been removed from a cubby or placed into the cubby by using sensor data generated by a sensor associated with the cubby. In some embodiments, the delivery assembly delivery module 170 uses the sensor data to determine whether the item matches a description in the delivery request to ensure that the item being removed or placed is the right item. The delivery assembly delivery module 170 may also determine a physical condition of the item.

The delivery assembly delivery module 170 may also manage the UI module 142. For example, the delivery assembly delivery module 170 generates indicators based on the state of the item or the delivery process and instructs the UI module 142 to provide the indicators to the user. An indicator may be light, text, sound, or some combination thereof. An indicator may inform the user of the state of the item or the delivery process or provide an instruction to the user. In an embodiment, the delivery assembly delivery module 170 generates textual or audio messages and instructs the UI module 142 to display the textual or audio messages. In another embodiment, the delivery assembly delivery module 170 toggles (e.g., turns on or activates and off or deactivates) a light on the UI module 142. The delivery assembly delivery module 170 may also control the delivery assembly based on user input received through the UI module 142. For example, the delivery assembly delivery module 170 can cause cubby doors in the delivery assembly to lock and unlock based on the user's interaction with the UI module 142.

In some embodiments, the delivery assembly delivery module 170 detects and processes errors occurred during the delivery. For example, the delivery assembly delivery module 170 may detect that the item removed or placed by the user does not match the description of the requested item in the delivery request. After such a detection, the delivery assembly delivery module 170 may send an error message to the UI module 142 to inform the user of the error. The delivery assembly delivery module 170 may also analyze an error, determine a solution to the error, and provide the user an instruction to help fix the error through the UI module 142. Additionally or alternatively, the delivery assembly delivery module 170 may report the error to the online system 106 and request the online system 106 to help provide a solution to the error.

Figure 6:
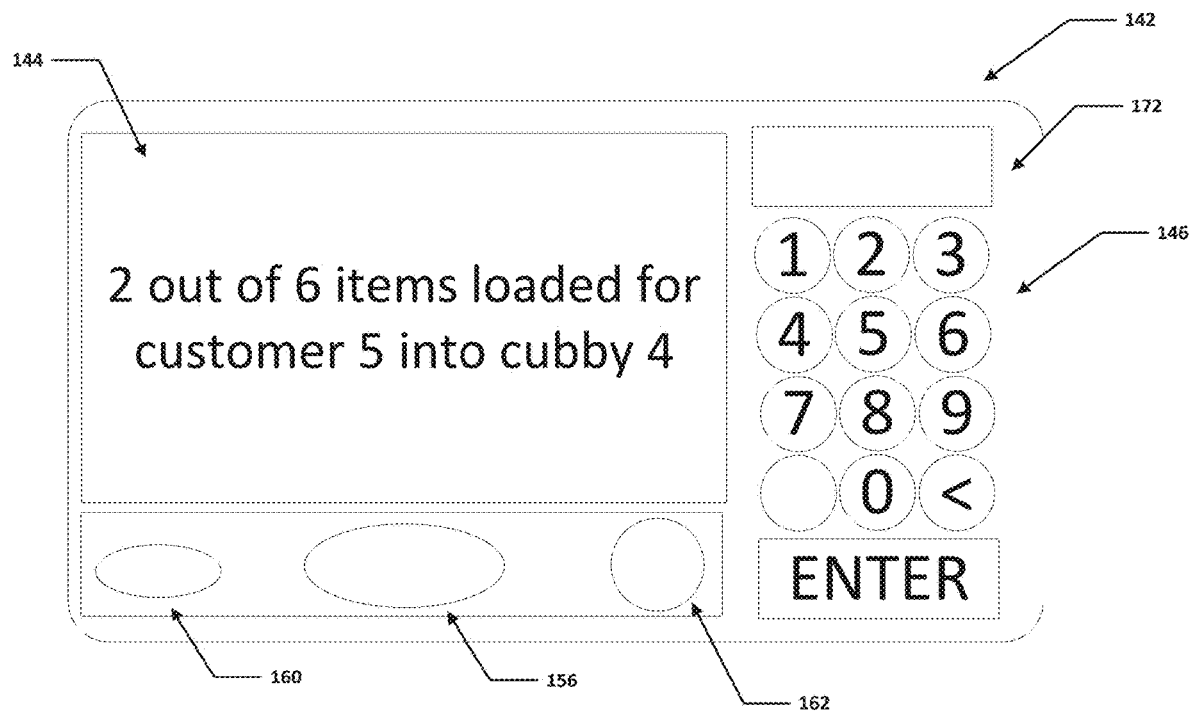
FIG. 6 illustrates a portion of a user interface for use in a delivery assembly according to some embodiments of the present disclosure.

FIG. 6 illustrates the UI module 142 according to some embodiments of the present disclosure. The UI module 142 can include the display 144, the UI input 146, the scanner 156, the microphone 160, and the speaker 162. In some examples, the UI input 146 is a physical keypad. In other examples, the UI input 146 is a virtual keypad. The UI input 146 can include a keypad display 172 to allow the user to see input from the UI input 146.

In some examples, the display 144 can be a touchscreen display. Depending on the use case of the delivery assembly 104 and the UI module 142, the display 144 can present different visual information to the user. More specifically, if a retail user (e.g., a retailer or supplier of goods to a customer user) is using the delivery assembly 104, the UI module 142 can be in a point of origination mode to allow the retail user to load one or more items into the delivery assembly 104 for delivery to the customer user by the AV 102. For example, as illustrated in FIG. 6, the display 144 can display specific loading information related to a customer user.

Figure 7:
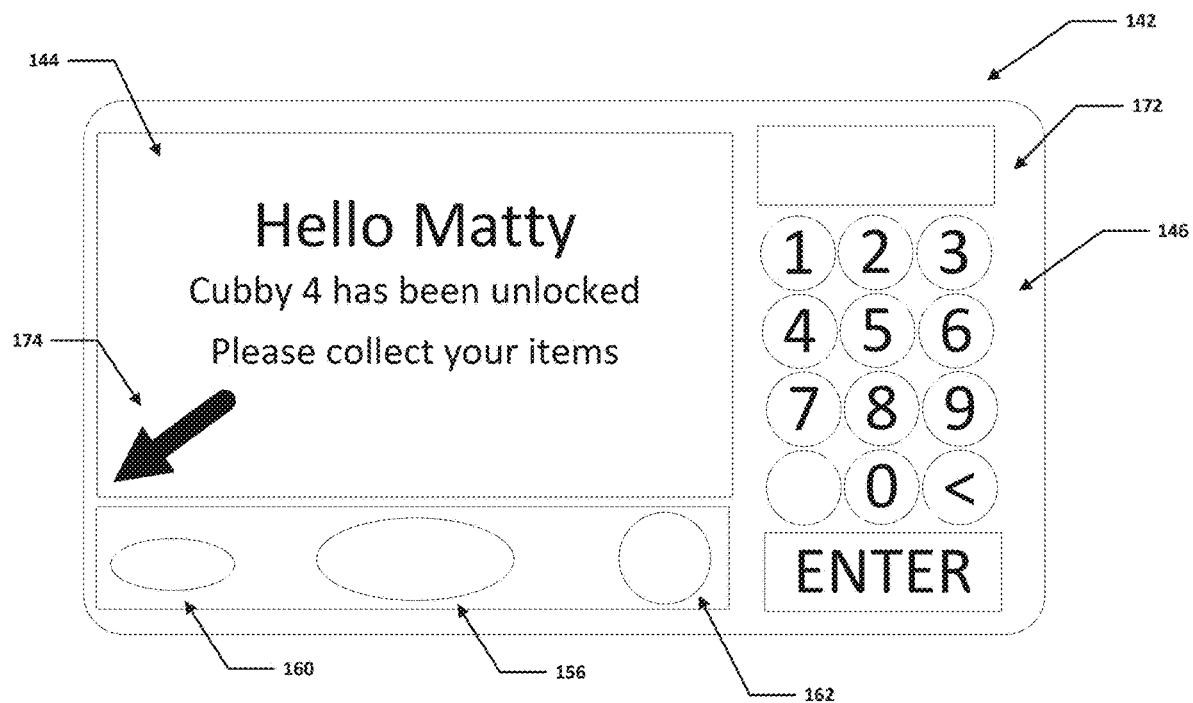
FIG. 7 illustrates a portion of a user interface for use in a delivery assembly according to some embodiments of the present disclosure.

FIG. 7 illustrates the UI module 142 according to some embodiments of the present disclosure. The UI module 142 can include the display 144, the UI input 146, the scanner 156, the microphone 160, and the speaker 162. In some examples, the UI input 146 is a physical keypad. In other examples, the UI input 146 is a virtual keypad. The UI input 146 can include a keypad display 172 to allow the user to see input from the UI input 146.

In some examples, the display 144 can be a touchscreen display. Depending on the use case of the delivery assembly 104 and the UI module 142, the display 144 can present different visual information to the user. More specifically, if a customer user is using the delivery assembly 104, the UI module 142 can be in a customer user mode to allow the customer user to access one or more items in the delivery assembly 104. For example, as illustrated in FIG. 7, the display 144 can display specific information related to a customer user. In some examples, an indicator 174 can be used to help the user identify a specific cubby that has been unlocked and can be accessed. More specifically, as illustrated in FIG. 7, an arrow on the display 144 can point to a specific cubby to help the user identify that the specific cubby has been unlocked and can be accessed.

Example Process

Figure 8:
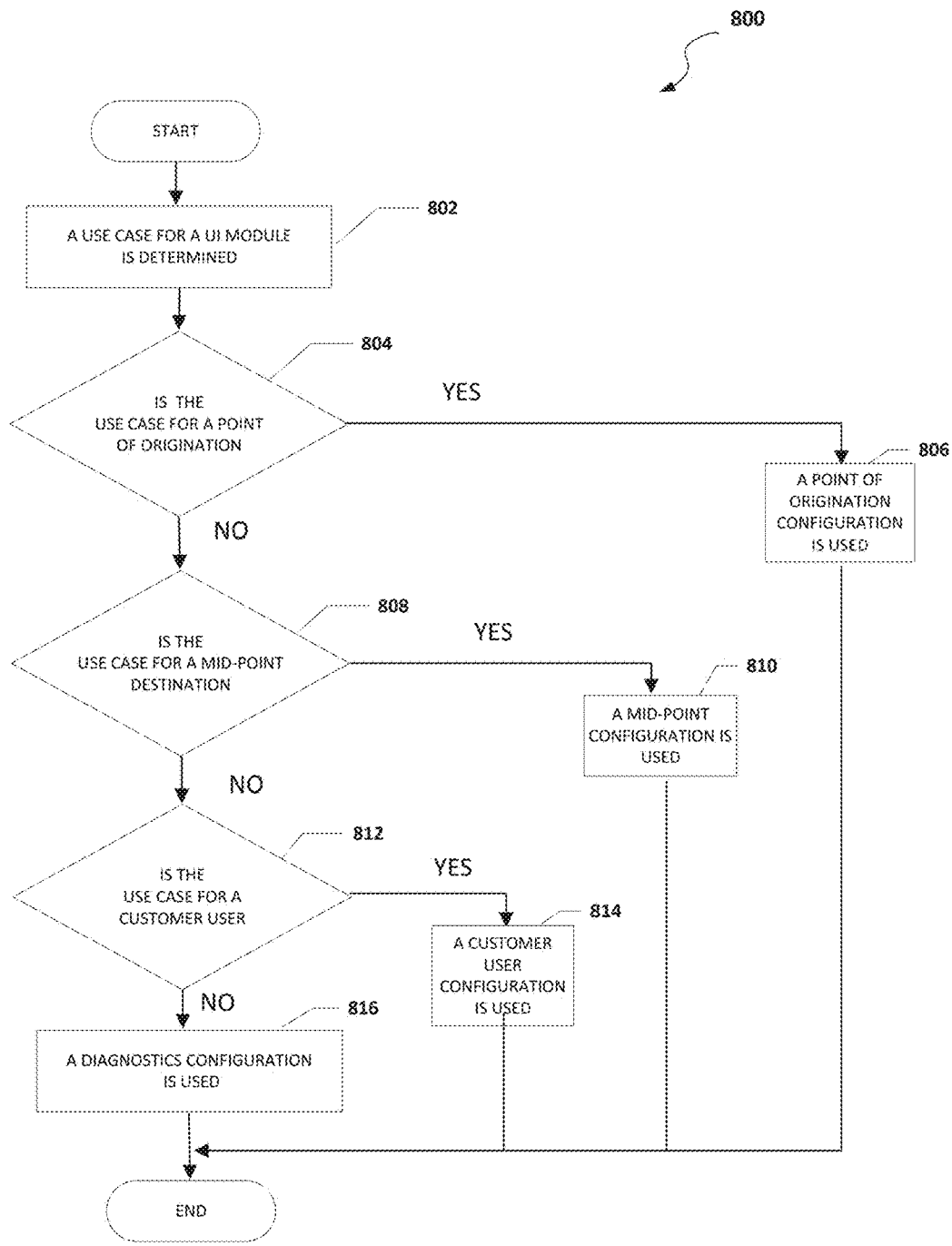
FIG. 8 is a flowchart showing a process for delivering an item to a user by using a vehicle according to some embodiments of the present disclosure.

FIG. 8 is an example flowchart illustrating possible operations of a flow 800 that may be associated with enabling a delivery by the AV, in accordance with an embodiment. In an embodiment, one or more operations of flow 800 may be performed by the AV 102, the delivery assembly 104, the UI module 142, the communication module 150, the biometric module 152, the authentication module 154, the scanner 156, the IR sensor 158, the microphone 160, the speaker 162, the display engine 164, and/or the memory 168. At 802, a use case for a UI module in a delivery assembly is determined. For example, the use case for the UI module 142 may be determined by a location of the AV 102 and/or a location of the delivery assembly 104, by a user interacting with the UI module 142 (e.g., if a customer user entered authentication data into the UI module), or by some other means. At 804, the system determines if the use case is for a point of origination. If the use case is for a point of origination, then a point of origination configuration for the UI module is used, as in 806. For example, the point of origination configuration for the UI module may include a configuration similar to the one illustrated in FIG. 6 where a retail user adds one or more items for a customer user to the delivery assembly 104.

If the use case is not for a point of origination, then the system determines if the use case is for a mid-point destination, as in 808. For example, a mid-point destination may be a retailer, other than a retailer that was the point of origination, that adds additional items to the delivery assembly 104. If the use case is for a mid-point destination, then a mid-point configuration for the UI module is used, as in 810. For example, the mid-point configuration for the UI module may include a configuration similar to the one illustrated in FIG. 6 where a retailer adds one or more items for a customer user to the delivery assembly 104.

If the use case is not for a mid-point destination, then the system determines if the use case is for a customer user. If the use case is for a customer user, then a customer user configuration is used, as in 814. For example, the customer user configuration for the UI module may include a configuration similar to the one illustrated in FIG. 7 where a customer user collects one or more items from the delivery assembly 104. If the use case is not for a customer user, then a diagnostic configuration is used, as in 816. For example, if system cannot determine the use case of the UI module 142 or if the system is being repaired, then a diagnostic configuration can be used. In some examples, the diagnostic configuration may be a blank display with the words "SERVICE NEEDED" or some other similar words or phrase and the UI module 142 may be locked or otherwise secured to help prevent tampering of the UI module 142 and the delivery assembly 104. In some examples, if the delivery assembly 104 is in a diagnostic configuration, only an authorized service user can unlock the delivery assembly 104.

Figure 9:
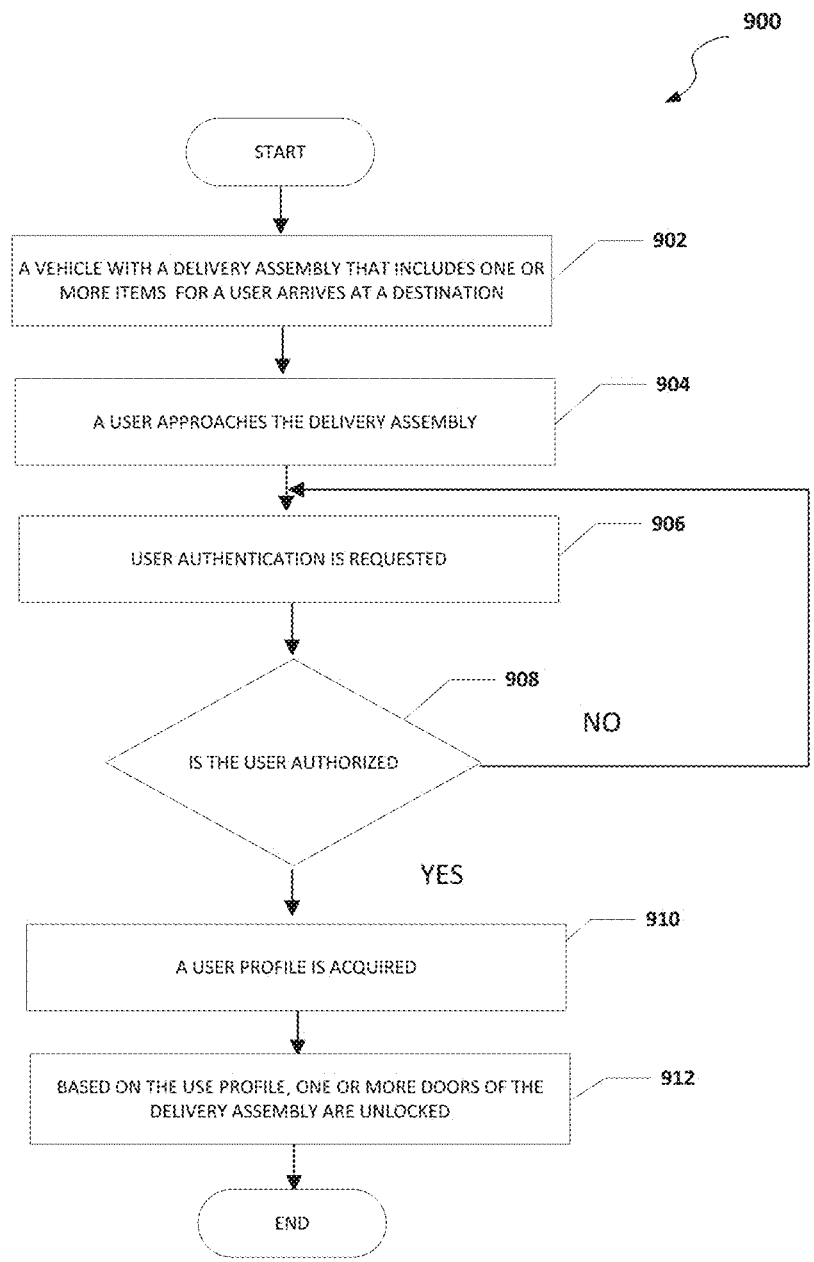
FIG. 9 is a flowchart showing a process for delivering an item to a user by using a vehicle according to some embodiments of the present disclosure.

FIG. 9 is an example flowchart illustrating possible operations of a flow 900 that may be associated with enabling a delivery by the AV, in accordance with an embodiment. In an embodiment, one or more operations of flow 900 may be performed by AV 102, the delivery assembly 104, the UI module 142, the communication module 150, the biometric module 152, the authentication module 154, the scanner 156, the IR sensor 158, the microphone 160, the speaker 162, the display engine 164, and/or the memory 168. At 902, a vehicle with a delivery assembly that includes one or more items for a user arrives at a destination. For example, the AV 102 with the delivery assembly 104 that includes one or more items for a user can arrive at a designated destination where the user can collect the one or more items. At 904, a user approaches the delivery assembly. At 906, user authentication is requested. For example, the user may be requested to enter a code on the UI input 146 of the UI module 142, to scan a QR code into the UI module 142, or some other means for user authentication may be requested. At 908, the system determines if the user is an authorized user. If the user is not an authorized user, then the system returns to 906 and again, user authentication is requested. If the user is an authorized user, then a user profile is acquired, as in 910. For example, the user profile can indicate where the one or more items for the user are location in the delivery assembly. At 912, based on the user profile, one or more doors of the delivery assembly are unlocked to allow the user to collect their items from the delivery assembly.

Figure 10:
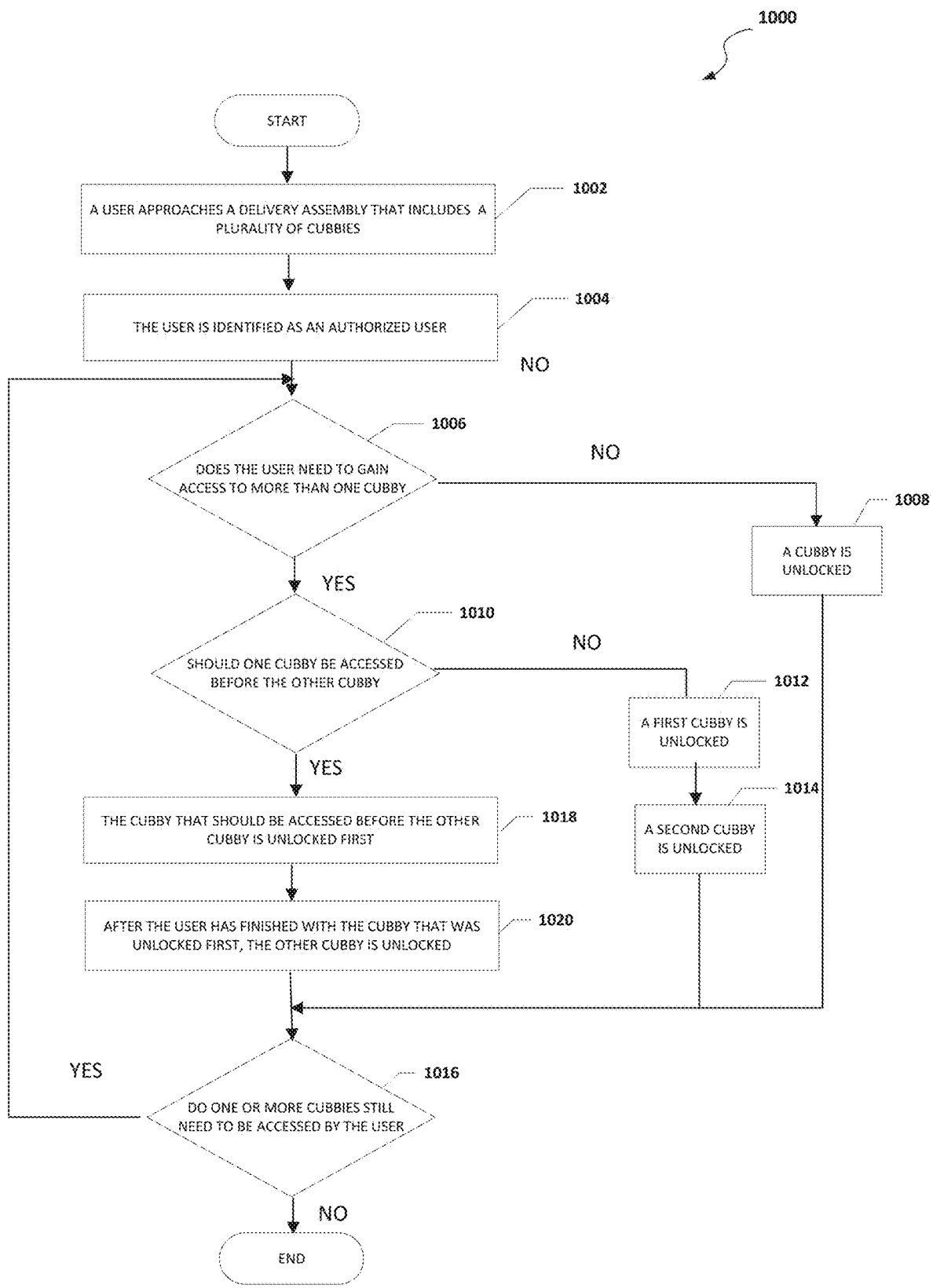
FIG. 10 is a flowchart showing a process for delivering an item to a user by using a vehicle according to some embodiments of the present disclosure.

FIG. 10 is an example flowchart illustrating possible operations of a flow 1000 that may be associated with enabling a delivery by the AV, in accordance with an embodiment. In an embodiment, one or more operations of flow 1000 may be performed by AV 102, the delivery assembly 104, the UI module 142, the communication module 150, the biometric module 152, the authentication module 154, the scanner 156, the IR sensor 158, the microphone 160, the speaker 162, the display engine 164, and/or the memory 168. At 1002, a user approaches a delivery assembly that includes a plurality of cubbies. At 1004, the user is identified as an authorized user. At 1006, the system determines if the user needs to gain access to more than one cubby. If the user does not need to gain access to more than one cubby, then the cubby that the user needs to access is unlocked, as in 1008.

If the user needs to gain access to more than one cubby, then the system determines if one cubby should be accessed before the other cubby, as in 1010. For example, one cubby may contain a perishable item such as ice-cream or some other frozen item that needs to be collected before other, non-perishable items are collected. If one cubby does not need to be accessed before the other cubby, then a first cubby is unlocked, as in 1012 and, at 1014, a second cubby is unlocked. In an example, the first cubby and second cubby are unlocked at about the same time and the first cubby and the second cubby can be opened at the same time. In another example, the second cubby is not unlocked until the items from the first cubby are removed. At 1016, the system determines if one or more cubbies still need to be accessed by the user.

Going back to 1010, if one cubby should be accessed before the other cubby, then the cubby that should be accessed before the other cubby is unlocked first, as in 1018. At 1020, after the user has finished with the cubby that was unlocked first, the other cubby is unlocked. At 1016, the system determines if one or more cubbies still need to be accessed. If the system determines that one or more cubbies still need to be accessed by the user, the system returns to 1006 and again determines if the user needs to gain access to more than one cubby. If the system determines that one or more cubbies do not need to be accessed by the user, then the process ends. In an example, the delivery assembly is located in an AV and after the user does not need access to any further cubbies, the AV and delivery assembly proceed to a next destination. It should be noted that in some examples, the above flow allows two or more cubbies to be unlocked and open at the same time. In other examples, only one cubby is unlocked and opened at a time.

Figure 11:
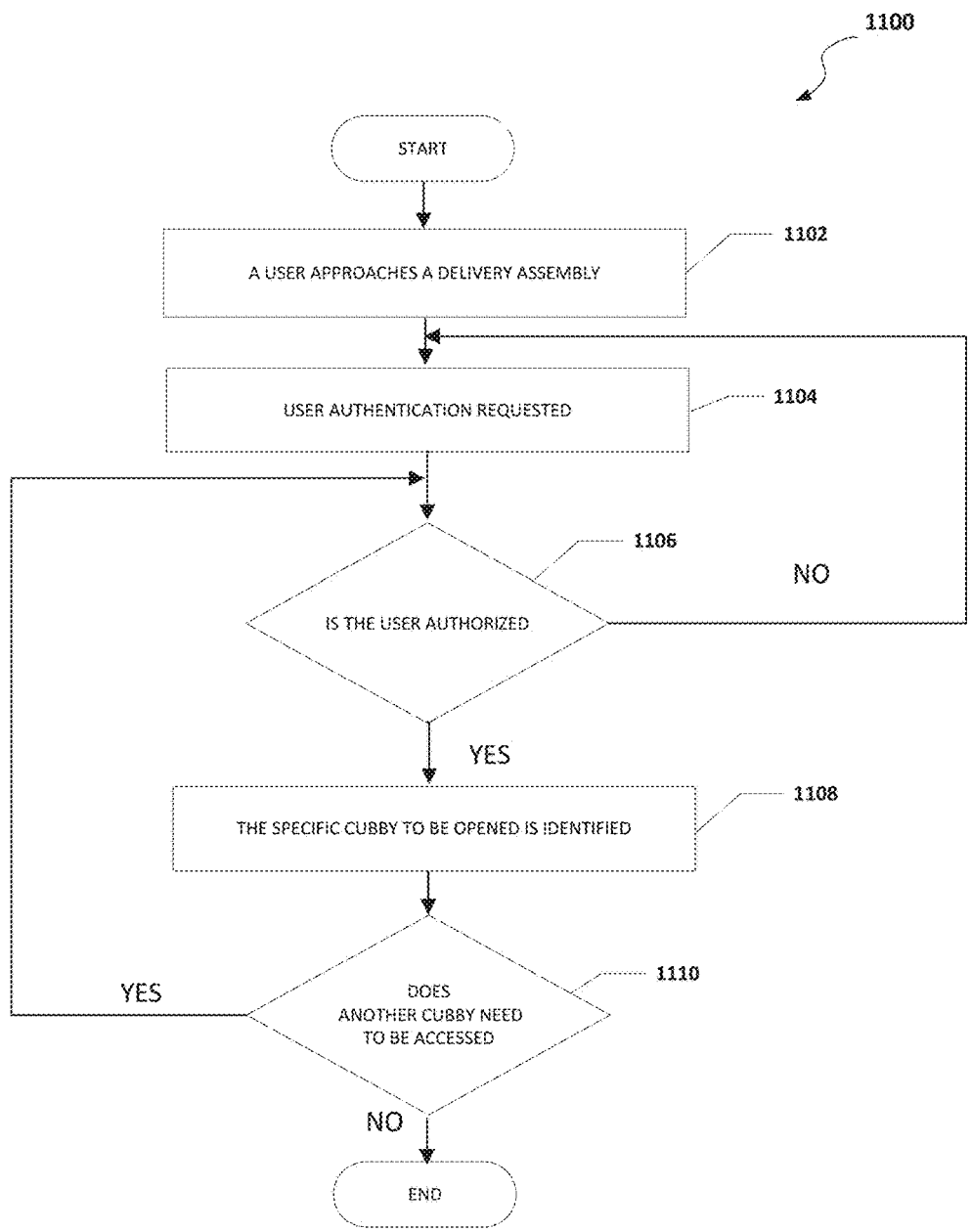
FIG. 11 is a flowchart showing a process for delivering an item to a user by using a vehicle according to some embodiments of the present disclosure.

FIG. 11 is an example flowchart illustrating possible operations of a flow 1100 that may be associated with enabling a delivery by the AV, in accordance with an embodiment. In an embodiment, one or more operations of flow 1100 may be performed by AV 102, the delivery assembly 104, the UI module 142, the communication module 150, the biometric module 152, the authentication module 154, the scanner 156, the IR sensor 158, the microphone 160, the speaker 162, the display engine 164, and/or the memory 168. At 1102, a user approaches a delivery assembly. At 1104, user authentication is requested. At 1106, the system determines if the user is authorized. If the user is not authorized, the system returns to 1104 and again, user authentication is requested. If the user is authorized, then a specific cubby to be opened is identified, as in 1108. For example, an indicator 174 can be used to help the user identify a specific cubby that has been unlocked and can be accessed. The indicator may be a symbol or icon on the display 144 of the UI module 142, light, text, sound, or some combination thereof. More specifically, as illustrated in FIG. 7, an arrow on the display 144 can point to a specific cubby to help the user identify that the specific cubby has been unlocked and can be accessed. At 1110, the system determines if another cubby needs to be accessed. If another cubby needs to be accessed, then the system returns to 1106 and again determines if the user is authorized. The system returns to 1106 and again determining if the user is authorized to help prevent theft or tampering. If another cubby does not need to be accessed, then the process ends.

Figure 12:
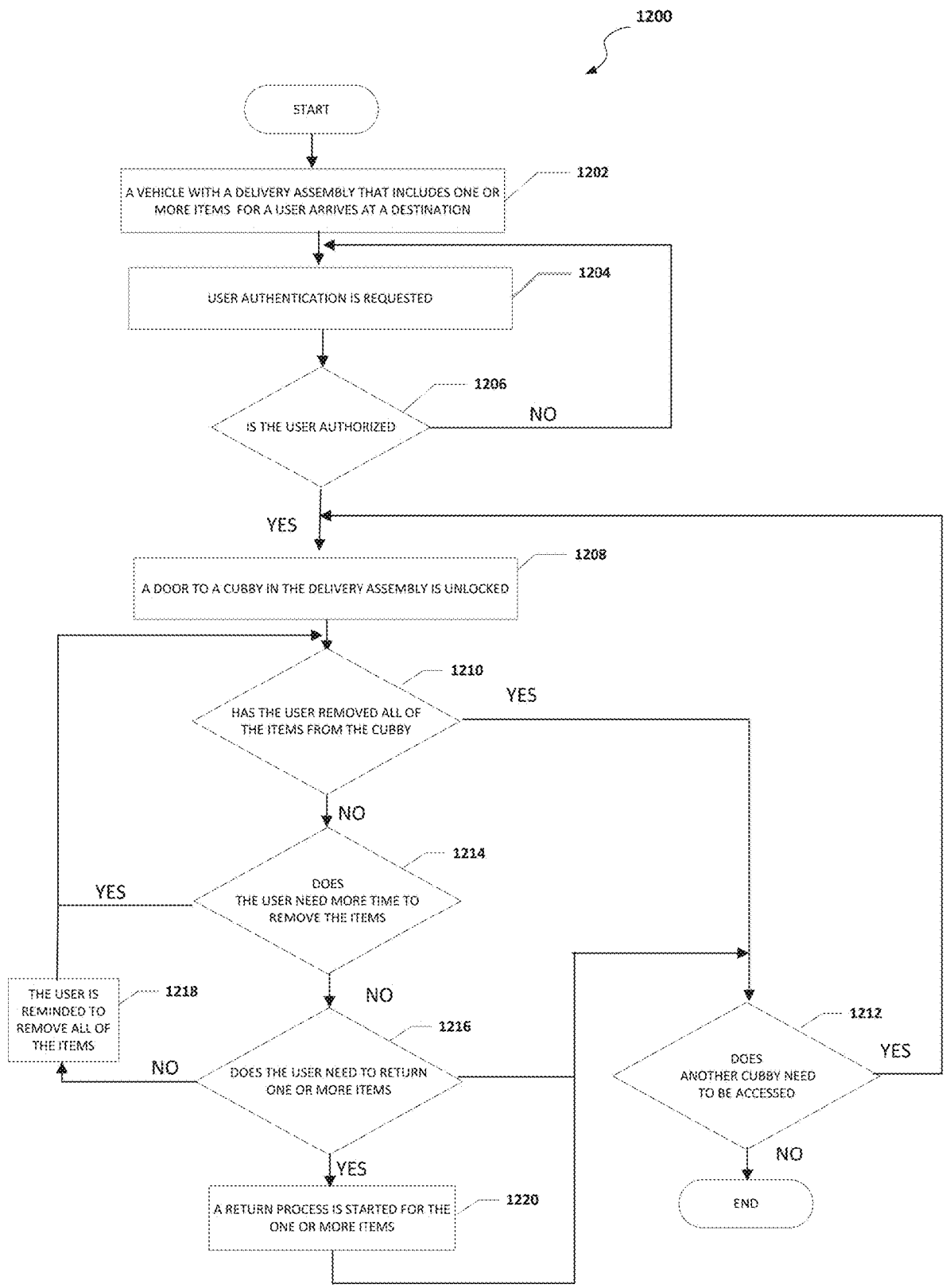
FIG. 12 is a flowchart showing a process for picking up an item from a user by using a vehicle according to some embodiments of the present disclosure.

FIG. 12 is an example flowchart illustrating possible operations of a flow 1200 that may be associated with enabling a delivery by the AV, in accordance with an embodiment. In an embodiment, one or more operations of flow 1200 may be performed by AV 102, the delivery assembly 104, the UI module 142, the communication module 150, the biometric module 152, the authentication module 154, the scanner 156, the IR sensor 158, the microphone 160, the speaker 162, the display engine 164, and/or the memory 168. At 1202, a vehicle with a delivery assembly that includes one or more items for a user arrives at a destination. At 1204, user authentication is requested. At 1206, the system determines if the user is authorized. If the user is not an authorized user, then the system returns to 1204 and again, user authentication is requested.

If the user is an authorized user, then a door to a cubby that includes the one or more items for the user in the delivery assembly is unlocked, as in 1208. At 1210, the system determines if the user has removed all of the contents of the cubby. If the user has removed all of the contents of the cubby, then the system determines if another cubby needs to be accessed, as in 1212. If another cubby does not need to be accessed, then the process ends. If another cubby does need to be accessed, then the system returns to 1208 and a door to a cubby that includes the one or more items for the user in the delivery assembly is unlocked.

Going back to 1210, if the system determines that the user has not removed all of the items of the cubby, then the system determines if the user needs more time to remove the items from the cubby, as in 1214. For example, the UI module 142 can prompt the user to press a button or icon on the UI module 142 to indicate the user needs more time to remove all of the items from the cubby. If the user does need more time removed all of the items of the cubby, then the system returns to 1210 and determines if the user has removed all of the contents of the cubby. If the user does not need more time to remove the items from the cubby, then the system determines if the user needs to return one or more items, as in 1216. If the user does not need to return one or more items, then the user is reminded to remove all of the items from the cubby, as in 1218 and the system returns to 1210 and determines if the user has removed all of the contents of the cubby. If the user does need to return one or more items, then a return process is started for the one or more items, as in 1220. For example, the UI module 142 can be used to prompt the user to initiate a return process for one or more items. In another example, the user's mobile device 148 can be used to prompt the user to initiate a return process for one or more items. At 1212, the system determines if another cubby need to be accessed.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

Additionally, one or more of the AV 102, the delivery assembly 104, and the UI module 142 may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an application specific integrated circuit (ASIC) that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Each of the AV 102, the delivery assembly 104, and the UI module 142 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Each of the AV 102, the delivery assembly 104, and the UI module 142 can include memory elements for storing information to be used in the operations outlined herein. The AV 102, the delivery assembly 104, and the UI module 142 may keep information in any suitable memory element (e.g., random access memory (RAM), read-only memory (ROM), erasable programmable ROM (EPROM), electrically erasable programmable ROM (EEPROM), ASIC, etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the AV 102, the delivery assembly 104, and the UI module 142 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these examples, memory elements can store data used for the operations described herein. This includes the memory elements being able to store software, logic, code, or processor instructions that are executed to carry out the activities described herein.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

OTHER NOTES AND EXAMPLES

Example M1 is a method including determining a location of the delivery assembly and in response to determining the location of the delivery assembly, configuring a user interface to facilitate the autonomous delivery, where the user interface has at least a point of origination configuration and a user configuration.

In Example M2, the subject matter of Example M1 can optionally include authenticating identification information of a user through the user interface.

In Example M3, the subject matter of Example M2 can optionally include based on the identification information of the user, allowing the user to access one or more cubbies of the delivery assembly.

In Example M4, the subject matter of Example M3 can optionally include informing the user through one or more indicators on the user interface that the user can access a specific cubby.

In Example M5, the subject matter of Example M1 can optionally include determining that the user should access at least two cubbies of the delivery assembly, wherein a first cubby should be accessed before a second cubby and informing the user through the user interface that the first cubby is available to be accessed before the user has access to the second cubby.

In Example, M6, the subject matter of Example M1 can optionally include where the user interface is configured in the point of origination configuration to allow a retail user to load items into one or more cubbies of the delivery assembly.

In Example, M7, the subject matter of Example M1 can optionally include where the user interface is configured in the user configuration to allow a user to unload items from one or more cubbies of the delivery assembly In Example, M8, the subject matter of Example M1 can optionally include determining that a user has approached the delivery assembly, requesting user authentication from the user, determining if the user is an authorized user, and unlocking at least one door of a cubby of the delivery assembly if the user is determined to be an authorized user In Example, M9, the subject matter of any of the Examples M1-M2 can optionally include based on the identification information of the user, allowing the user to access one or more cubbies of the delivery assembly.

In Example, M10, the subject matter of any of the Examples M1-M3 can optionally include informing the user through one or more indicators on the user interface that the user can access a specific cubby.

In Example, M11, the subject matter of any of the Examples M1-M4 can optionally include determining that the user should access at least two cubbies of the delivery assembly, wherein a first cubby should be accessed before a second cubby and informing the user through the user interface that the first cubby is available to be accessed before the user has access to the second cubby.

In Example, M12, the subject matter of any of the Examples M1-M5 can optionally include where the user interface is configured in the point of origination configuration to allow a retail user to load items into one or more cubbies of the delivery assembly.

In Example, M13, the subject matter of any of the Examples M1-M6 can optionally include where the user interface is configured in the user configuration to allow a user to unload items from one or more cubbies of the delivery assembly.

In Example, M14, the subject matter of any of the Examples M1-M7 can optionally include determining that a user has approached the delivery assembly, requesting user authentication from the user, determining if the user is an authorized user, and unlocking at least one door of a cubby of the delivery assembly if the user is determined to be an authorized user.

In Example, M15, the subject matter of any of the Examples M1-M8 can optionally include where the user interface includes a keypad and the user authentication is a keycode entered into the user interface using the keypad.

In Example, M16, the subject matter of any of the Examples M1-M5 can optionally include the one or more indicators include light, text, sound, or some combination thereof.

In Example, M17, the subject matter of any of the Examples M1-M9 can optionally include providing an indicator through the user interface that informs the user to place one or more items into a specific cubby of the delivery assembly.

In Example, M18, the subject matter of any of the Examples M1-M9 can optionally include where the user interface includes a keypad and the user authentication is a keycode entered into the user interface using the keypad.

Example MM1 is a method including identifying a delivery assembly located in an autonomous vehicle, wherein the delivery assembly includes a plurality of cubbies for storing items and a user interface, determining a location of the autonomous vehicle, and in response to determining the location of the autonomous vehicle, configuring a user interface, wherein the user interface has at least a point of origination configuration and a user configuration.

In Example MM2, the subject matter of Example MM1 can optionally include where determining that a user has approached the delivery assembly, requesting user authentication from the user, determining if the user is an authorized user, and unlocking at least one door of a cubby from the plurality of cubbies if the user is determined to be an authorized user.

In Example MM3, the subject matter of Example MM2 can optionally include where the user interface includes a keypad and the user authentication is a keycode entered into the user interface using the keypad.

In Example MM4, the subject matter of Example MM1 can optionally include where the user interface is configured in the point of origination configuration to allow a retailer to load items into one or more cubbies of the delivery assembly.

In Example MM5, the subject matter of any of Example MM4 can optionally include where providing an indicator to the user through the user interface that informs the user to place one or more items into a specific cubby of the delivery assembly.

In Example, MM6, the subject matter of Example MM1 can optionally include where the user interface is configured in the user configuration to allow a user to retrieve one or more items from one or more cubbies of the delivery assembly.

In Example, MM7, the subject matter of Example MM6 can optionally include providing an indicator to the user through the user interface that informs the user to retrieve one or more items from a specific cubby of the delivery assembly.

In Example, MM8, the subject matter of Example MM1 can optionally include authenticating identification information of the user through the user interface located on the delivery assembly.

In Example, MM9, the subject matter of Example MM8 can optionally include based on the identification information of the user, allowing the user to access one or more cubbies of the delivery assembly.

In Example, MM10, the subject matter of Example MM9 can optionally include informing the user through one or more indicators on the user interface that the user can access a specific cubby.

In Example, MM11, the subject matter of Example MM10 can optionally the one or more indicators include light, text, sound, or some combination thereof.

In Example, MM12, the subject matter of Example MM1 can optionally include determining that the user should access at least two cubbies, wherein a first cubby should be accessed before a second cubby and informing the user through the user interface that the first cubby is available to be accessed before the user has access to the second cubby.

In Example, MM13, the subject matter of Example MM1 can optionally include where the user interface is configured in the point of origination configuration and all the cubbies are unlocked to allow a retailer to load items into the cubbies of the delivery assembly.

In Example, MM14, the subject matter of Example MM1 can optionally include where the user interface is configured in the user configuration to allow a user to unload items from one or more cubbies of the delivery assembly.

In Example MM15, the subject matter of any of the Examples MM1-MM2 can optionally include where the user interface includes a keypad and the user authentication is a keycode entered into the user interface using the keypad.

In Example MM16, the subject matter of any of the Examples MM1-MM3 can optionally include where the user interface is configured in the point of origination configuration to allow a retailer to load items into one or more cubbies of the delivery assembly.

In Example MM17, the subject matter of any of the Examples MM1-MM4 can optionally include where providing an indicator to the user through the user interface that informs the user to place one or more items into a specific cubby of the delivery assembly.

In Example, MM18, the subject matter of any of the Examples MM1-MM5 can optionally include where the user interface is configured in the user configuration to allow a user to retrieve one or more items from one or more cubbies of the delivery assembly.

In Example, MM19, the subject matter of any of the Examples MM1-MM6 can optionally include providing an indicator to the user through the user interface that informs the user to retrieve one or more items from a specific cubby of the delivery assembly In Example, MM20, the subject matter of any of the Examples MM1-MM7 can optionally include authenticating identification information of the user through the user interface located on the delivery assembly.

In Example, MM21, the subject matter of any of the Examples MM1-MM8 can optionally include based on the identification information of the user, allowing the user to access one or more cubbies of the delivery assembly.

In Example, MM22, the subject matter of any of the Examples MM1-MM9 can optionally include informing the user through one or more indicators on the user interface that the user can access a specific cubby.

In Example, MM23, the subject matter of any of the Examples MM1-MM10 can optionally the one or more indicators include light, text, sound, or some combination thereof.

In Example, MM24, the subject matter of any of the Examples MM1-MM11 can optionally include determining that the user should access at least two cubbies, wherein a first cubby should be accessed before a second cubby and informing the user through the user interface that the first cubby is available to be accessed before the user has access to the second cubby.

In Example, MM25, the subject matter of any of the Examples MM1-MM12 can optionally include where the user interface is configured in the point of origination configuration and all the cubbies are unlocked to allow a retailer to load items into the cubbies of the delivery assembly.

In Example, MM26, the subject matter of any of the Examples MM1-MM13 can optionally include where the user interface is configured in the user configuration to allow a user to unload items from one or more cubbies of the delivery assembly.

Example A1, is an autonomous delivery system to deliver items to a user using an autonomous vehicle, the autonomous delivery system comprising a delivery assembly, wherein the delivery assembly can be removably secured in the autonomous vehicle, a plurality of cubbies located in the delivery assembly, wherein each of the plurality of cubbies can store one or more items to be delivered to the user, and a user interface, wherein each of the plurality of cubbies is accessed through the user interface.

In Example A2, the subject matter of Example A1 can optionally include where in response to a determined location of the delivery assembly, the user interface is configured in a point of origination configuration or a user configuration.

In Example A3, the subject matter of Example A1 can optionally include where the user interface includes an authentication module to authenticate a user and allow the user to access the delivery assembly.

In Example A4, the subject matter of Example A1 can optionally include where the delivery assembly is in communication with a network on a network path that is separate from a network path that the autonomous vehicle uses to connect to the network.

In Example A5, the subject matter of Example A1 can optionally include where the user interface informs the user through one or more indicators that the user can access a specific cubby.

In Example A6, the subject matter of any of Examples A1-A2 can optionally include where the user interface includes an authentication module to authenticate a user and allow the user to access the delivery assembly.

In Example A7, the subject matter of any of Examples A1-A3 can optionally include where the delivery assembly is in communication with a network on a network path that is separate from a network path that the autonomous vehicle uses to connect to the network.

In Example A8, the subject matter of any of Examples A1-A4 can optionally include where the user interface informs the user through one or more indicators that the user can access a specific cubby.

In Example A9, the subject matter of any of Examples A1-A5 can optionally include where the user interface includes a keypad and the user is authenticated using a keycode entered into the user interface using the keypad In Example A10, the subject matter of any of Examples A1-A5 can optionally include where the user interface includes a keypad and a display.

In Example A11, the subject matter of any of Examples A1-A5 can optionally include where in response to a determined location of the autonomous vehicle, the user interface is configured in a point of origination configuration or a user configuration.

In Example A12, the subject matter of any of Examples A1-A5 can optionally include where the one or more indicators include light, text, sound, or some combination thereof.

In Example A13, the subject matter of any of Examples A1-A5 can optionally include where a first cubby should be accessed before a second cubby and the user interface informs the user through one or more indicators that the first cubby is available to be accessed before the user has access to the second cubby Example AA1 is a device including at least one machine-readable medium comprising one or more instructions that, when executed by at least one processor, causes the at least one processor to determine a location of a delivery assembly transported by an autonomous vehicle, and in response to determining the location of the delivery assembly, configure a user interface to help facilitate autonomous delivery of at least one item, wherein the user interface has at least a point of origination configuration and a user configuration.

In Example AA2, the subject matter of Example AA1 can optionally include one or more instructions that, when executed by at least one processor, causes the at least one processor to authenticate identification information of a user through the user interface.

In Example AA3, the subject matter of Example AA2 can optionally include one or more instructions that, when executed by at least one processor, causes the at least one processor to, based on the identification information of the user, allow the user to access one or more cubbies of the delivery assembly.

In Example AA4, the subject matter of Example AA1 can optionally include where the user interface is configured in the point of origination configuration to allow a retail user to load items into one or more cubbies of the delivery assembly.

In Example AA5, the subject matter of Example AA1 can optionally include where the user interface is configured in the user configuration to allow a user to unload items from one or more cubbies of the delivery assembly.

In Example AA6, the subject matter of Example AA1 can optionally include one or more instructions that, when executed by at least one processor, causes the at least one processor to determine that a user has approached the delivery assembly, request user authentication from the user, determine if the user is an authorized user, and unlock at least one door of a cubby of the delivery assembly if the user is determined to be an authorized user.

In Example AA7, the subject matter of any of Examples AA1-AA2 can optionally include one or more instructions that, when executed by at least one processor, causes the at least one processor to, based on the identification information of the user, allow the user to access one or more cubbies of the delivery assembly.

In Example AA8, the subject matter of any of Examples AA1-AA3 can optionally include where the user interface is configured in the point of origination configuration to allow a retail user to load items into one or more cubbies of the delivery assembly.

In Example AA9, the subject matter of any of Examples AA1-AA4 can optionally include where the user interface is configured in the user configuration to allow a user to unload items from one or more cubbies of the delivery assembly.

In Example AA10, the subject matter of any of Examples AA1-AA5 can optionally include one or more instructions that, when executed by at least one processor, causes the at least one processor to determine that a user has approached the delivery assembly, request user authentication from the user, determine if the user is an authorized user, and unlock at least one door of a cubby of the delivery assembly if the user is determined to be an authorized user.

In Example AA11, the subject matter of any of Examples AA1-AA6 can optionally include one or more instructions that, when executed by at least one processor, causes the at least one processor to inform the user through one or more indicators on the user interface that the user can access a specific cubby.

In Example AA12, the subject matter of Example AA7 can optionally include where the one or more indicators include light, text, sound, or some combination thereof In Example AA13, the subject matter of any of Examples AA1-AA6 can optionally include one or more instructions that, when executed by at least one processor, causes the at least one processor to determine that the user should access at least two cubbies of the delivery assembly, wherein a first cubby should be accessed before a second cubby and inform the user through the user interface that the first cubby is available to be accessed before the user has access to the second cubby.

In Example AA14, the subject matter of any of Examples AA1-AA6 can optionally include one or more instructions that, when executed by at least one processor, causes the at least one processor to provide an indicator to the user through the user interface that informs the user to place one or more items into a specific cubby of the delivery assembly.

In Example AA15, the subject matter of any of Examples AA1-AA6 can optionally include one or more instructions that, when executed by at least one processor, causes the at least one processor to provide an indicator to the user through the user interface that informs the user to retrieve one or more items from a specific cubby of the delivery assembly.

In Example AA16, the subject matter of any of Examples AA1-AA6 can optionally include where the user interface includes a keypad and the user authentication is a keycode entered into the user interface using the keypad.

What is claimed is:

1. A method for facilitating autonomous delivery using a delivery assembly secured to and transported by an autonomous vehicle, the delivery assembly having cubbies and a user interface, the user interface having a display, the method, performed by one or more processors, comprising:
   determining a location of the delivery assembly based on sensor data collected by an onboard sensor suite of the autonomous vehicle;
   determining a current use case for the user interface of the delivery assembly based on the location of the delivery assembly, from at least three use cases: a point of origination use case, a mid-point destination use case, and a customer user use case;
   in response to determining that the current use case is the customer user use case, configuring the user interface to use a customer user configuration, wherein using the customer user configuration comprises:
   authenticating and authorizing a customer user to access one or more items in a specific cubby of the cubbies, wherein the specific cubby stores the one or more items within a secured space during the transport of the delivery assembly by the autonomous vehicle; and allowing the customer user to unload the one or more items from the specific cubby of the delivery assembly, including displaying an arrow in the display of the user interface that points in a direction of to the specific cubby of the cubbies for which the customer user is authenticated and authorized to access; and in response to determining that the current use case is the point of origination use case, configuring the user interface to use a point of origination configuration, wherein using the point of origination configuration comprises allowing a retail user to load the one or more items into the specific cubby of the delivery assembly.

2. The method of claim 1, wherein authenticating the customer user comprises:

authenticating identification information of the customer user through the user interface.

3. The method of claim 2, wherein authorizing the customer user comprises:

based on the identification information of the customer user, identifying the specific cubby of the cubbies of the delivery assembly which the customer user is authorized to access.

4. The method of claim 3, wherein allowing the customer user to unload the one or more items comprises:

informing the customer user the display of the user interface that the specific cubby has been unlocked.

5. The method of claim 1, wherein:

authorizing the customer user comprises determining that the customer user should access at least two cubbies of the delivery assembly, wherein a first cubby should be accessed before a second cubby; and allowing the customer user to unload the one or more items comprises informing the customer user through the user interface that the first cubby is available to be accessed before the customer user has access to the second cubby.

6. The method of claim 1, further comprising:

in response to determining that the current use case is the mid-point destination use case, configuring the user interface to use a mid-point destination configuration, wherein using the mid-point destination configuration comprises allowing a further retail user to load one or more additional items into the specific cubby of the delivery assembly.

7. The method of claim 1, further comprising:

in response to determining that the current use case is not the point of origin use case, the mid-point destination use case, nor the customer user use case, configuring the user interface to use a diagnostic configuration.

8. The method of claim 7, wherein using the diagnostic configuration comprises:

displaying "SERVICE NEEDED" on the display of the user interface.

9. The method of claim 7, wherein using the diagnostic configuration comprises:

locking or securing the user interface to prevent tampering of the user interface and the delivery assembly.

10. An autonomous delivery system to deliver items to a customer user using an autonomous vehicle, the autonomous delivery system comprising:

a delivery assembly, wherein the delivery assembly is secured in and transported by the autonomous vehicle;

a plurality of cubbies located in the delivery assembly, wherein each of the plurality of cubbies can store one or more items to be delivered to the customer user; and a user interface implemented by one or more processors, to:

determine a location of the delivery assembly based on sensor data collected by an onboard sensor suite of the autonomous vehicle; and determine a current use case of the user interface based on the location of the delivery assembly and to select and use one of a plurality of configurations, including a point of origination configuration, a mid-point destination configuration, a customer user configuration, that corresponds to a current use case of the user interface;

wherein:

the point of origination configuration allows a retail user to, via the user interface, access and load one or more items into a specific cubby of the cubbies of the delivery assembly, wherein the specific cubby stores the one or more items within a secured space during the transport of the delivery assembly by the autonomous vehicle;

the mid-point destination configuration allows a further retail user to, via the user interface, access and load one or more additional items into the specific cubby of the delivery assembly; and the customer user configuration allows the customer user to, via the user interface, access and unload the one or more items from the specific cubby of the delivery assembly.

11. The autonomous delivery system of claim 10, wherein the user interface further uses a diagnostic configuration if the current use case cannot be determined by the user interface.

12. The autonomous delivery system of claim 10, wherein, when the user interface uses the customer user configuration, the user interface authenticates the customer user and allows the customer user to access the delivery assembly.

13. The autonomous delivery system of claim 10, wherein the delivery assembly is in communication with a network on a network path that is separate from a network path that the autonomous vehicle uses to connect to the network.

14. The autonomous delivery system of claim 10, wherein:

the user interface has a display and is located in a middle right-side portion of the delivery assembly; and when the user interface uses the customer user configuration, the user interface informs the customer user that the customer user can access the specific cubby by displaying an arrow in the display of the user interface that points in a direction of to the specific cubby of the cubbies which the customer user is authenticated and authorized to access.

15. One or more machine-readable non-transitory media comprising one or more instructions that, when executed by at least one processor, causes the at least one processor to:

determine a location of a delivery assembly secured to and transported by an autonomous vehicle based on sensor data collected by an onboard sensor suite of the autonomous vehicle, wherein the delivery assembly comprises cubbies and a user interface; and determine a current use case of the user interface based on the location of the delivery assembly;

select a corresponding configuration for the user interface based on the current use case, from a plurality of configurations, including a point of origination configuration, a mid-point destination configuration, a customer user configuration, that corresponds to a current use case of the user interface; and configure the user interface to use the corresponding configuration;

wherein:
- configuring the user interface to use the point of origination configuration comprises allowing a retail user to, through the user interface, access and load one or more items into a specific cubby of the delivery assembly, wherein the specific cubby stores the one or more items within a secured space during the transport of the delivery assembly by the autonomous vehicle;
- configuring the user interface to use the mid-point destination configuration comprises allowing a further retail user to, through the user interface, access and load one or more additional items into the specific cubby of the delivery assembly; and
- configuring the user interface to use the customer user configuration comprises allowing a customer user to, through the user interface, access and unload the one or more items from the specific cubby of the delivery assembly.

16. The one or more machine-readable non-transitory media of claim 15, wherein allowing the customer user to access and unload the one or more items comprises:
authenticating identification information of a user through the user interface.

17. The one or more machine-readable non-transitory media of claim 16, wherein allowing the customer user to access and unload the one or more items comprises:
- identifying the specific cubby that the customer user is authorized to access based on the identification information of the user; and
- allowing the user to access the specific cubby of the delivery assembly.

18. The one or more machine-readable non-transitory media of claim wherein allowing the customer user to access and unload one or more items comprises:
displaying an arrow in the display of the user interface that points in a direction of to the specific cubby of the cubbies which the customer user is authenticated and authorized to access.

19. The one or more machine-readable non-transitory media of claim wherein determining the current use case comprises selecting one of the following, based on the location of the delivery assembly: a point of origination use case, a mid-point destination use case, and a customer user configuration use case.

20. The one or more machine-readable non-transitory media of claim wherein the one or more instructions that, when executed by the at least one processor, causes the at least one processor to further:
in response to determining that the current use case is not a point of origin use case, a mid-point destination use case, nor a customer user use case, configuring the user interface to use a diagnostic configuration by locking or securing the user interface to prevent tampering of the user interface and the delivery assembly.

* * * * *